US006657921B1

(12) United States Patent
Ambs

(10) Patent No.: US 6,657,921 B1
(45) Date of Patent: Dec. 2, 2003

(54) MARINE SEISMIC SENSOR DEPLOYMENT SYSTEM INCLUDING RECONFIGURABLE SENSOR HOUSINGS

(75) Inventor: Loran D. Ambs, Fulshear, TX (US)

(73) Assignee: WesternGeco LLC, Houston, TX (US)

( * ) Notice: Subject to any disclaimer, the term of this patent is extended or adjusted under 35 U.S.C. 154(b) by 0 days.

(21) Appl. No.: 09/584,439

(22) Filed: May 31, 2000

(51) Int. Cl.⁷ .................................................. G01V 1/38
(52) U.S. Cl. ........................................... 367/20; 367/16
(58) Field of Search ............................ 367/20, 15, 13, 367/135, 133, 16; 181/101; 340/850; 73/12.13, 84; 441/11

(56) References Cited

U.S. PATENT DOCUMENTS

| 4,404,666 A | * | 9/1983 | Stevens et al. ............. 114/295 |
| 4,823,325 A | | 4/1989 | Cole ........................... 367/20 |
| 4,919,065 A | * | 4/1990 | Murray et al. .............. 114/312 |
| 5,113,377 A | | 5/1992 | Johnson ....................... 367/20 |
| 5,189,642 A | | 2/1993 | Donoho et al. ............... 367/15 |
| 5,339,281 A | | 8/1994 | Narendra et al. .............. 367/5 |
| 5,894,450 A | * | 4/1999 | Schmidt et al. ............. 367/134 |
| 6,024,344 A | * | 2/2000 | Buckley et al. ............... 267/76 |
| 6,093,069 A | * | 7/2000 | Schelfhout .................... 441/11 |

FOREIGN PATENT DOCUMENTS

WO  WO 97/48989  12/1997

* cited by examiner

Primary Examiner—Marc S. Hoff
Assistant Examiner—Anthony Gutierrez
(74) Attorney, Agent, or Firm—David S. Figatner; Williams, Morgan & Amerson, P.C.

(57) ABSTRACT

A system for collecting seismic data from geologic formations underlying water. A plurality of hydrodynamic housings are deployable in the water and are permitted to descend at a fast rate through the water until the housings contact the geologic formations. A controller engaged with each housing reconfigures the housing to enhance contact between the housing and the geologic formations and to reduce impact of ocean currents acting against the housing. A marine seismic sensor is engaged with each housing to detect seismic data and to sensor orientation. Each housing can be disconnected from the associated marine seismic sensor to facilitate retrieval of the seismic sensors to the water surface.

21 Claims, 2 Drawing Sheets

MARINE SEISMIC SENSOR DEPLOYMENT SYSTEM INCLUDING RECONFIGURABLE SENSOR HOUSINGS

BACKGROUND OF THE INVENTION

The present invention relates to the field of marine seismic exploration. More particularly, the invention relates to the collection of marine seismic data in deep water environments.

Marine seismic exploration requires acoustic source generators for delivering energy to subsurface geologic formations and boundaries. The acoustic energy is discharged along shot lines in the desired survey region and is reflected by the subsurface formations and boundaries. The reflected energy propagates upwardly and is detected with hydrophones or bottom cable geophones. Data from selected shot patterns are processed to construct an overall acoustic image of the subsurface geologic formations.

Bottom cable systems use geophones or hydrophones laid on the sea floor. Cable crews assemble each cable from multiple cable sections. Bottom cables are deployed and retrieved with the assistance of powerful linear traction engines and other machines. In shallow water up to one hundred meters deep, one or more vessels deploy the geophones and cable in the selected locations and retrieve the geophones and cables after the selected area is surveyed.

Bottom cables are used in relatively shallow water depths to communicate between underwater seismic equipment located on board a marine seismic vessel. Bottom cables are heavy because the sensor packs are heavy and depend upon gravity to achieve physical coupling between the geophones and ocean bottom. Additionally, such cables contain insulated wires for transmitting electrical power and signals between submarine seismic assets and the seismic vessel, and a heavy strength member is required to lift the submarine assets from the ocean bottom and to resist hydrodynamic and mechanical loads imposed on the cable during such recovery. The weight, size and reliability issues regarding bottom cables, together with the operational expense of deploying and retrieving bottom cables, effectively prevents conventional bottom cable systems from being economically deployed in deep water.

Conventional bottom cable systems are not useful in deep water because such systems require expensive, powerful and complex handling equipment and such systems have a large cross-section which produces significant hydrodynamic drag and correspondingly long deployment and retrieval times. Conventional bottom cable systems require significant repair costs and operational downtime due to frequent mechanical and electrical failure of cable components resulting from repeated exposure to stress loading experienced during cable retrieval from the ocean floor.

In addition to technical difficulties inherent in bottom cable systems, the size, weight and handling requirements of bottom cable systems are expensive and difficult to implement in deep water environments. To overcome these limitations, marine seismic streamer vessels are conventionally used in deep water to perform seismic surveys. Marine seismic vessels tow acoustic energy sources such as compressed air guns through the water. The vessels also tow one or more seismic streamer cables along the selected survey line. The streamers typically range between three and eight kilometers long, with tail buoys attached to the free streamer ends. Each streamer contains multiple hydrophones which receive the reflected energy emitted by the energy source, and the hydrophones are wired together in receiver groups regularly spaced along the streamer. To account for vessel movement, data recording and processing calculations require time and position correlations for each active component of the seismic data gathering system.

Variations in lateral spacing between adjacent streamers due to environmental forces and vessel course changes can adversely affect the collected data. The actual spacing between receiver groups is critical for an accurate analysis of geophysical data. Because the acoustic energy reflections propagate through the water in a towed streamer system, noise significantly distorts the reflected energy. The problems associated with undesirable noise is well known. For example, U.S. Pat. No. 4,970,696 to Crews et al. (1990) disclosed a three dimensional seismic survey system having multiple seismic receivers. Undesirable noise was characterized with uniform sampling intervals and the recorded responses were processed to remove the undesirable noise. In other systems, additional processing is required to account for additional noise and the quality of maps created from the processed data is reduced.

Various systems have been proposed to collect data in a marine environment and to return the data to the water surface. U.S. Pat. No. 4,007,436 to McMahon (1977) disclosed a flexible sheet for holding hydrophones. U.S. Pat. No. 4,692,906 to Neeley disclosed an ocean bottom seismometer having a weighted skirt which also provided a buoyant space for retrieving the seismometer to the water surface. U.S. Pat. No. 5,189,642 to Donoho et al. (1993) disclosed a seafloor seismic recorder having a chassis which lowered geophones into contact with the seafloor. A geophone package was embedded into the seafloor and a control package and chassis was raised above the seafloor surface with a leg extension to isolate such components from the geophone package. A ballast ring returned the geophone package to the water surface. Additionally, U.S. Pat. No. 5,696,738 to Lazauski (1997) disclosed a sensing device in contact with the seafloor.

Other systems have been developed to operate and to collect seismic data from multiple recorders. U.S. Pat. No. 4,281,403 to Siems (1981) disclosed a plurality of remote seismic recording units activated with local clocks in each local recording unit, together with a master clock in a central station. U.S. Pat. No. 5,623,455 to Norris (1997) disclosed remote units connected to a plurality of receivers for collecting and transmitting seismic data over a selected transmission channel. U.S. Pat. No. 5,724,241 to Wood et al. (1998) disclosed a distributed data acquisition system having a plurality of recorders for detecting and recording seismic data. The data was collected and continuously collected by data acquisition modules.

A need exists for an improved deep water seismic data collection system. The system should be economic to deploy and should preserve the quality of collected data.

SUMMARY OF THE INVENTION

The present invention provides a system for collecting seismic data from geologic formations underlying water. The system comprises a plurality of housings deployable in the water, wherein each housing has a first end having a hydrodynamic profile for facilitating descent of the housing through the water and into contact with the geologic formations. A controller is engaged with each housing for reconfiguring the housing after the housing contacts the geologic formations, and one or more marine seismic sensors are engaged with each housing for detecting seismic data and for identifying the orientation of the sensor. An actuator facilitates retrieval of each marine seismic sensor to the water surface.

The method of the invention comprises the steps of operating a vessel in water, of deploying a plurality of housings and engaged marine seismic sensors into the water until each housing contacts the geologic formations, of operating a controller engaged with each housing to reconfigure the housing after the housing contacts the geologic formations, of operating the marine seismic sensors to detect seismic source energy reflections and to record seismic data representing such reflections, and of operating an actuator to facilitate retrieval of each marine seismic sensor to the water surface.

DESCRIPTION OF THE PREFERRED EMBODIMENTS

Figure 1:
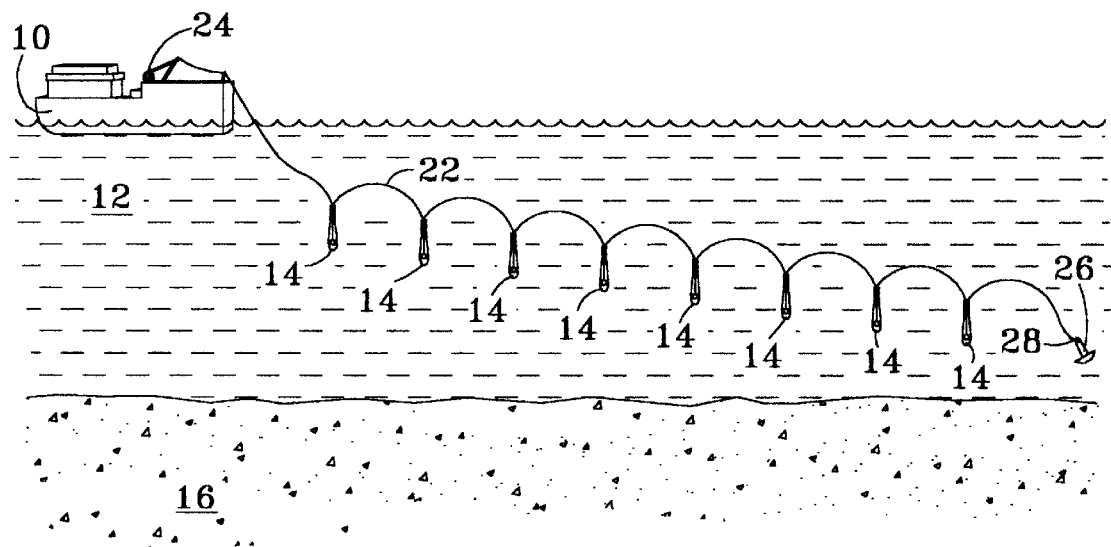
FIG. 1 illustrates a vessel for deploying housings in water.

The invention provides a system for positioning marine seismic sensors in deep water and for retrieving such sensors for further processing of seismic data. Referring to FIG. 1, tender barge or vessel 10 moves through water 12 to deploy and to retrieve a plurality of seismic geophones 14 deployable to the surface of geologic formations identified as seafloor 16. Geophones 14 can be dropped into water 12 between several meters and thousands of meters in depth and can be positioned within a seismic data collection array as described below.

Figure 2:
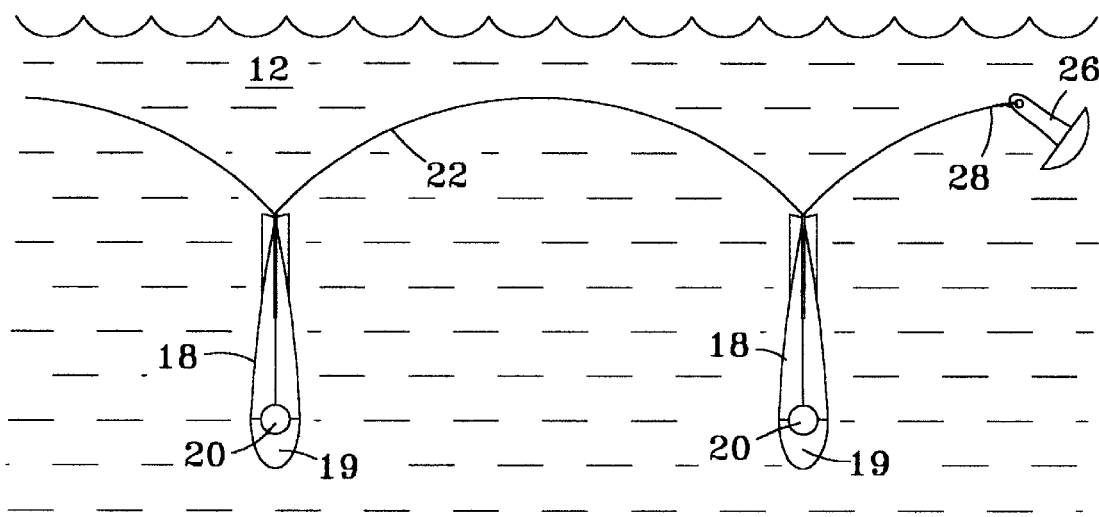
FIG. 2 illustrates housings attached to a cable descending in water.

As shown in FIG. 2, each geophone 14 generally includes housing 18, ballast weight 19, and marine seismic sensor 20. Ballast weight 19 can be integrated within housing 18 or can comprise a separate component. If ballast weight 19 comprises a separate component, descriptions herein for the attachment to or detachment from of housing 18 from sensor 20 are equally possible for ballast weight 19 or both. Each seismic sensor 20 detects seismic energy and can comprise different devices suitable for detecting and recording seismic source energy reflections. As a representative example, seismic sensors 20 can comprise geophones or hydrophones or combinations thereof such as an ocean bottom seismometer unit having up to four acoustic sensing components, a data recorder, battery pack, data storage mechanism, acoustic transponder, timer, acoustic modem, compass, gimbal lock, and other conventional equipment. Each seismic sensor 20 preferably includes a buoyant exterior pressure case suitable for withstanding high water pressures located deep in the ocean, and components and equipment can be located inside or outside of such pressure case.

In one embodiment of the invention, geophones 14 can be connected to cable 22 deployed from wheel 24 attached to vessel 10. Although cable 22 is especially adapted to placement of geophones 14 in a substantially straight line, cable 22 is sufficiently flexible to permit placement of geophones 14 in nonlinear or alternative array configurations. As used herein, the term "plurality" means two or more. Each geophone 14 is engaged with or is attached to cable 22 at a selected position. The distances between adjacent geophones 14 can be equal or can vary to provide desired geophone 14 separations. Anchor 26 can be attached to free end 28 of cable 22 to facilitate initial placement of cable 22 within water 12 at a selected location relative to seafloor 16. Anchors 26 can be placed at other locations to account for high current or unstable seafloor 16 conditions.

To deploy geophones 14 within water 12, geophones 14 are transported with vessel 10 or other means to the seismic survey region. Geophones 14 can be stored in a sequential manner to facilitate deployment. Anchor 26 is attached to cable 22 free end 28, and is deployed into water 12 at the desired position within the seismic survey area.

Figure 5:
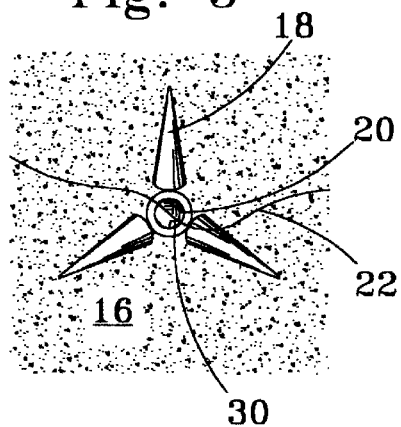
FIG. 5 illustrates a plan view of a housing in contact with the seafloor.
Figure 3:
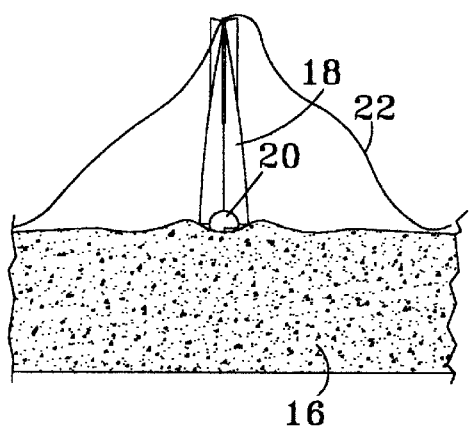
FIGS. 3 and 4 illustrates housings in contact with the seafloor.
Figure 4:
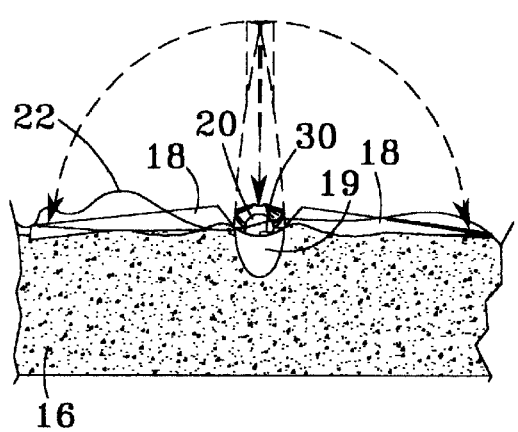

The deployment of geophones 14 is preferably controlled by movement of vessel 10 within water 12 in a substantially horizontal plane relative to the survey area. In other embodiments of the invention, geophones 14 can be deployed from a submarine or other subsurface vessel or from an airplane. The unique hydrodynamic shape of geophones 14 and ballast weight 19 significantly expedite the descent of geophones 14 in water 12, thereby reducing the required deployment time. In a preferred embodiment of the invention, each geophone 14 contacts or is substantially proximate to seafloor 16 and is relatively stationary relative to seafloor 16 as shown in FIG. 3. Following such initial contact, controller 30 engaged with housing 18 is operated to reconfigure housing 18 as illustrated in FIG. 4. As illustrated for such an embodiment, housing 18 unfolds into one or more "petals" which hinge downwardly and flatten against seafloor 16, as shown in FIG. 5. By changing the configuration of housings 18, contact with seafloor 16 and the resulting receipt of seismic data is significantly enhanced, and acoustic and mechanical effects due to ocean currents and other forces is significantly reduced. In other embodiments of the invention, controller 30 can be operated to vibrate or otherwise move housing 18 so that contact between housing 18, ballast weight 19 and seafloor 12 is further enhanced.

The density and shape of geophones 14 can be selected so that geophones 14 contact seafloor 16 in a predictable and effectively coupled manner to maintain the fidelity of recorded seismic data. In other embodiments of the invention, seismic sensor 20 can be supported above seafloor 16 with a frame, support, flexible pad, inflatable bag, or other device. Although different positions of seismic sensor 20 relative to seafloor 16 are possible, the preferred embodiment places seismic sensor 20 directly in contact with seafloor 16.

As each seismic sensor 20 reaches the desired location, gimbals can orient internal components such as geophones, hydrophones, data recorders, compasses, and other conventional equipment. Such orientation can be locked with existing gimbal locks. Gimbals are not necessary to the invention but are useful if seafloor 16 has a significant slope or unstable composition. Operation of seismic sensor 20 can be initiated before deployment to perform continuous recording, or it can be initiated with a preset clock or with another type of trigger or control signal (acoustic, optical, low frequency radio, or another method) transmitted through water 12 or through signals transmitted through cable 22. If internal clock mechanisms are used within seismic sensors 20, such clock mechanisms can be synchronized to a calibrated clock such as a GPS clock, rubidium clock, cesium clock, or other clock prior to deployment of recorders into water 12. Although cable 22 provides the functions of positioning and retrieving multiple recorders, cable 22 can also provide digital and analog data telemetry, system control signals, and power transmission capabilities. Cable 22 may be connected directly or indirectly to a distributed or centralized data recording system (not shown).

The location of cable 22 and seismic sensors 20 can be mapped by acoustic positioning, by first-break positioning with a seismic source, by computer cable lay monitoring and control modeling software, or a combination of these techniques. If each geophone 14 is independently deployed to seafloor 12, connections of cable 22 can be made to each geophone 14 with a remotely operated vehicle or with an intelligent propulsion system attached to one or more geophones 14. Seismic sensors 20 may use active control surfaces on the hydrodynamic housing 18 to steer geophone 14 and cable 22 as they free-fall to a desired location within the survey using an acoustic or inertial navigational system. Connections between geophones 14 can be made in a serial or multi-node network.

After all seismic sensors 20 are positioned, a seismic event can be promulgated and recorded with sensors integrated with seismic sensors 20. Different techniques can be implemented to conserve battery power. In one embodiment of the invention, an acoustic, optical, or low frequency radio trigger or other method can be sent to each seismic sensor 20 to initiate a recording cycle. The duration of the recording cycle can be programmed so that a "stop" signal is not required. An initiation command can also be sent which identifies the initiation time and data to be collected, and which also includes the time for cessation of data recordation. Each seismic sensor 20 preferably records continuously and time stamps the recorded data with sufficient accuracy to correlate collected seismic data to the relevant source time. Patterns of acoustic energy source points can be planned on the surface of water 12 with standard seismic acquisition techniques.

Figure 6:
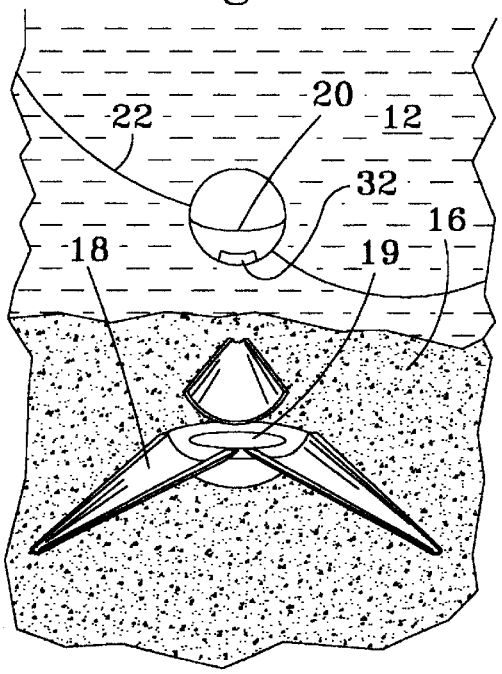
FIG. 6 illustrates disconnection of seismic sensors from housings for retrieval to the water surface.
Figure 7:
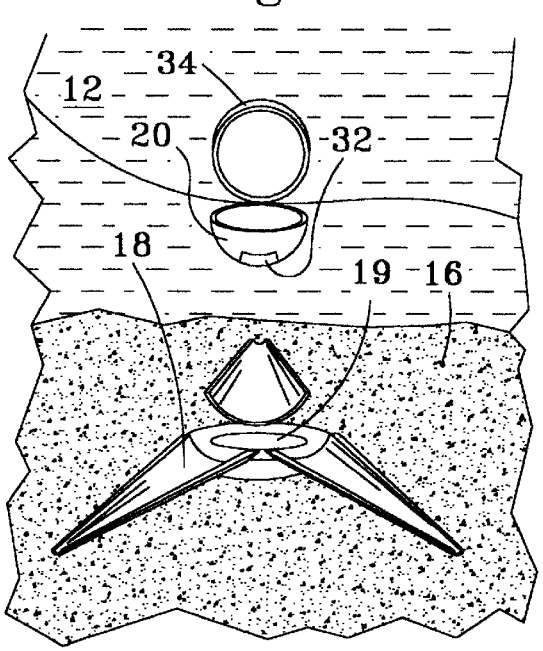
FIG. 7 illustrates an inflatable balloon attached to each seismic sensor.

After seismic shooting is completed for the selected area, seismic sensors 20 can be retrieved to the surface with cable 22 or with other techniques. Actuator 32 engaged with seismic sensor 20, ballast weight 19, and housing 18 is operated to separate seismic sensor 20 from ballast weight 19, or from housing 18, or both. Seismic sensor 20 can be retrieved to the surface of water 12 with cable 22, as shown in FIG. 6, or with a flotation device such as balloon 34 attached to seismic sensor 20, as shown in FIG. 7. Actuator 32 can be operated with acoustic signals, timer clocks, or other mechanisms and can be operated simultaneously or sequentially for each seismic sensor 20 within an array.

Housing 18 can be formed with a substantially biodegradable material which deteriorates into innocuous residue. Ballast weight 19 can be formed with benign materials such as stone, pottery, metal or combinations thereof in a biodegradable matrix material. By separating seismic sensor 20 from ballast weight 19 or from housing 18, the positive buoyancy of seismic sensor 20 facilitates transit to the surface of water 12 without requiring large buoyancy tanks or pods which occupy valuable deck space on board vessel 10 and which slow the descent of geophones 14 in water 12. Actuator 32 can also jettison other external components of geophone 14 such as battery packs or other components which can also be formed with substantially biodegradable materials.

As seismic sensors 20 are retrieved, each seismic sensor 20 is connected to a data extraction station (not shown) and the seismic data detected can be extracted for recording and data processing. The data can be written to magnetic storage media in a common receiver, shot sequential method, or processed with other conventional data processing techniques. After the data is collected, each seismic sensor 20 can be reattached to another expendable ballast weight 19 or housing 18 or both for future deployment.

The invention uniquely provides a reliable, inexpensive technique for deploying and retrieving seismic data recorders in water. The invention is particularly suitable for deep water because of the deployment flexibility and the absence of seals and other operating components in the deployment and retrieval system. The ease of geophone installation and removal facilitates vessel crew work and provides the opportunity to automate such work functions. Because the system does not depend on electrical integrity within a cable, failure of a single recorder does not jeopardize data collection operations for the other deployed recorders.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A system for collecting seismic data from geologic formations underlying water, comprising:
    a plurality of housings deployable in the water, wherein each housing has a first end having a hydrodynamic profile for facilitating descent of said housing through the water and into contact with the geologic formations;
    a controller engaged with each housing for reconfiguring said housing after said housing contacts the geologic formations;
    at least one marine seismic sensor engaged with each housing for detecting seismic data and for identifying the orientation of said sensor; and
    an actuator for facilitating retrieval of each marine seismic sensor to the water surface.

2. A system as recited in claim 1, wherein each housing can be reconfigured by said controller to flatten against the geologic formations.

3. A system as recited in claim 2, wherein each housing can be reconfigured by said controller to detach into separate housing sections for contact with the geologic formations.

4. A system as recited in claim 1, wherein each housing is formed with a substantially biodegradable material.

5. A system as recited in claim 1, wherein said controller is capable of moving said housing to enhance contact between said housing and the geologic formations.

6. A system as recited in claim 1, further comprising a cable for connecting a seismic sensor to an adjacent sensor after the housings associated with said seismic sensors have contacted the geologic formations.

7. A system as recited in claim 1, further comprising a cable attached to said housings as said housings are deployed in the water.

8. A system as recited in claim 7, wherein said actuator comprises a cable retrieval machine attached to a vessel on the water surface.

9. A system as recited in claim 1, wherein said actuator comprises a release mechanism for disconnecting said marine seismic sensor from said housing.

10. A system as recited in claim 1, wherein said actuator comprises an inflatable balloon for retrieving said marine seismic sensor to the water surface.

11. A marine seismic method for detecting seismic source energy reflected from a subsurface geologic formation, comprising:

deploying a plurality of housings and engaged marine seismic sensors into a body of water, wherein each housing has a first end having a hydrodynamic profile for facilitating descent of each housing through the water and into contact with the geologic formation;

operating a controller engaged with each housing to reconfigure said housing after said housing contacts the geologic formation;

operating said marine seismic sensors to detect seismic source energy reflections and to record seismic data representing such reflections; and operating an actuator to facilitate retrieval of each marine seismic sensor to the water surface.

12. A method as recited in claim 11, further comprising the step of attaching a cable to said housings before said housings are deployed into the water.

13. A method as recited in claim 11, further comprising the step of selecting the housing shape based on the geologic formation composition.

14. A method as recited in claim 11, further comprising the step of operating said controller to move said housing to enhance contact between said housing and the geologic formations.

15. A method as recited in claim 11, further comprising the step of operating each marine seismic sensor to identify the location of each seismic sensor relation to the geologic formations.

16. A method as recited in claim 11, further comprising the step of operating said actuator to disconnect each housing from the associated marine seismic sensor before said seismic sensor is retrieved to the water surface.

17. A method as recited in claim 16, further comprising the step of operating said actuator to inflate a flotation device associated with said marine seismic sensor.

18. A method as recited in claim 16, further comprising the steps of attaching a cable between said marine seismic sensors and of operating said actuator to retrieve said cable and attached marine seismic sensors to the water surface after said housings are disconnected from said marine seismic sensors.

19. A method, comprising:

deploying a plurality of geophones into a body of water, wherein each geophone includes a housing having a hydrodynamically profiled end for facilitating descent through the water and into contact with a subsea geologic formation; and reconfiguring said housing after said housing contacts the geologic formation.

20. The method of claim 19, further comprising at least one of:

controlling the reconfigured housing to enhance contact between the housing and the geologic formation;

mapping the location of a plurality of marine seismic sensors, said marine seismic sensors each being engaged with a respective one of the reconfigured housings;

detecting seismic source energy reflected from the geologic formation with the marine seismic sensors;

recording the detected seismic data representing the reflections; and retrieving the marine seismic sensors to the surface of the body of water.

21. The method of claim 19, wherein deploying the geophones includes controlling the descent of the geophones into a selected location and into contact with the geologic formation.

* * * * *